United States Patent
Wu et al.

(10) Patent No.: US 7,583,740 B2
(45) Date of Patent: Sep. 1, 2009

(54) APPARATUS AND METHOD FOR TRACKING SAMPLING CLOCK IN MULTI-CARRIER COMMUNICATION SYSTEM

(75) Inventors: Kuo-Ming Wu, Nan-Tou (TW); Der-Zheng Liu, Tai-Nan (TW)

(73) Assignee: Realtek Semiconductor Corp., HsinChu (TW)

( * ) Notice: Subject to any disclaimer, the term of this patent is extended or adjusted under 35 U.S.C. 154(b) by 602 days.

(21) Appl. No.: 11/307,096

(22) Filed: Jan. 23, 2006

(65) Prior Publication Data
US 2006/0215776 A1 Sep. 28, 2006

(30) Foreign Application Priority Data
Jan. 24, 2005 (TW) .............................. 94102063 A

(51) Int. Cl.
*H04K 1/10* (2006.01)
(52) U.S. Cl. .................... 375/260; 375/150; 375/142; 375/147; 375/152; 375/326; 375/343; 375/375
(58) Field of Classification Search ............... 375/260, 375/150, 142, 147, 152, 326, 343, 375
See application file for complete search history.

(56) References Cited

U.S. PATENT DOCUMENTS

| 6,493,395 | B1 | 12/2002 | Isaksson | |
| 2002/0021715 | A1* | 2/2002 | Matheus et al. | 370/480 |
| 2003/0012302 | A1 | 1/2003 | Webster | |
| 2004/0184551 | A1 | 9/2004 | Liu | |
| 2005/0084025 | A1* | 4/2005 | Chen | 375/260 |

FOREIGN PATENT DOCUMENTS

| TW | 576053 | 2/2004 |
| TW | 200420053 | 10/2004 |
| WO | WO9741672 | 11/1997 |

* cited by examiner

*Primary Examiner*—Shuwang Liu
*Assistant Examiner*—Kabir A Timory
(74) *Attorney, Agent, or Firm*—Winston Hsu

(57) ABSTRACT

An apparatus and method for tracking a sampling clock are disclosed. The apparatus includes a compensating circuit compensating phases of a first and a second received symbols according to a compensating signal and thereby generating a first and a second compensated symbols; a data removal circuit removing a first predetermined transmitted data from the first compensated symbol, and a second predetermined transmitted data from the second compensated symbol and thereby generating a first and a second data removal symbols; and a computing circuit generating a sampling clock offset according to the first and the second data removal symbols, and adjusting the sampling clock signal according to the sampling clock offset.

17 Claims, 2 Drawing Sheets

APPARATUS AND METHOD FOR TRACKING SAMPLING CLOCK IN MULTI-CARRIER COMMUNICATION SYSTEM

BACKGROUND OF THE INVENTION

1. Field of the Invention

The present invention relates to a multi-carrier communication system, and more specifically, to an apparatus for tracking a sampling clock of a multi-carrier communication system.

2. Description of the Prior Art

A transmitter of a multi-carrier communication system utilizes a plurality of sub-carriers to modulate predetermined transmitted data and transmits the modulated data to a receiver in the form of a continuous data flow. At this time, the receiver samples the above-mentioned continuous data flow utilizing a sampling clock. When the frequency of the sampling clock includes a small offset, a phase-shift may be occurred between the received symbol generated by the receiver and the original transmitted data transmitted by the transmitter. Therefore, the multi-carrier communication system compensates the above-mentioned N received symbols by estimating a sampling clock offset utilizing a plurality of pilot symbols to eliminate the effect caused by the sampling clock offset, wherein each pilot symbol is utilized for transmitting a predetermined data X. The receiver computes the sampling clock offset according to the received symbol R corresponding to the pilot symbol and the predetermined data X. Please refer to the following equation for the relationship between the received symbol R and the predetermined data X.

$$R_{i,j,k} = e^{-j2\pi \frac{k}{N} \tau_{i,j}} \cdot e^{j\psi_{i,j}} \cdot H_{j,k} \cdot X_{i,j,k} + N_{i,j,k} \qquad \text{Equation (1)}$$

Wherein, $R_{i,j,k}$ denotes a received symbol transmitted by a $k^{th}$ sub-carrier and a $j^{th}$ band in a $i^{th}$ time period.

$\tau_{i,j}$ denotes a phase difference resulting from a sampling clock offset.

$\psi_{i,j}$ denotes a carrier phase-shift.

H denotes a channel estimation value.

$N_{i,j,k}$ denotes a noise signal in the channel.

By equation (1), it is known that the conventional receiver requires the consumption of a great amount of resources due to the complicated computations during the above-mentioned computation processes.

SUMMARY OF THE INVENTION

One of the objectives of the claimed invention is therefore to provide an apparatus and method for tracking a sampling clock of a multi-carrier communication system, to solve the above-mentioned problem.

An additional objective of the claimed invention is to provide an apparatus and method for tracking a sampling clock to compensate all of the received symbols in repeatedly feedback-compensating manner.

A further objective of the claimed invention is to provide an apparatus and method to reduce the complexity of a receiver and the to reduce the load of a computing unit.

According to the claimed invention, an apparatus comprises: a compensating circuit compensating phases of a first and a second received symbols according to a compensating signal and thereby generating a first and a second compensated symbols; a data removal circuit removing a first predetermined transmitted data from the first compensated symbol, and a second predetermined transmitted data from the second compensated symbol and thereby generating a first and a second data removal symbols; and a computing circuit generating a sampling clock offset according to the first and the second data removal symbols, and adjusting the sampling clock signal according to the sampling clock offset.

In addition, according to the claimed invention, a method for tracking a sampling clock is disclosed. The method comprises: generating a first and a second compensated symbols by adjusting phases of a first and a second received symbols according to a compensating signal; removing a first and a second predetermined transmitted data from the first and the second compensated symbols, and thereby generating a first and a second data removal symbols; generating a sampling clock offset according to the first and the second data removal symbols; and adjusting the sampling clock signal according to the sampling clock offset.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
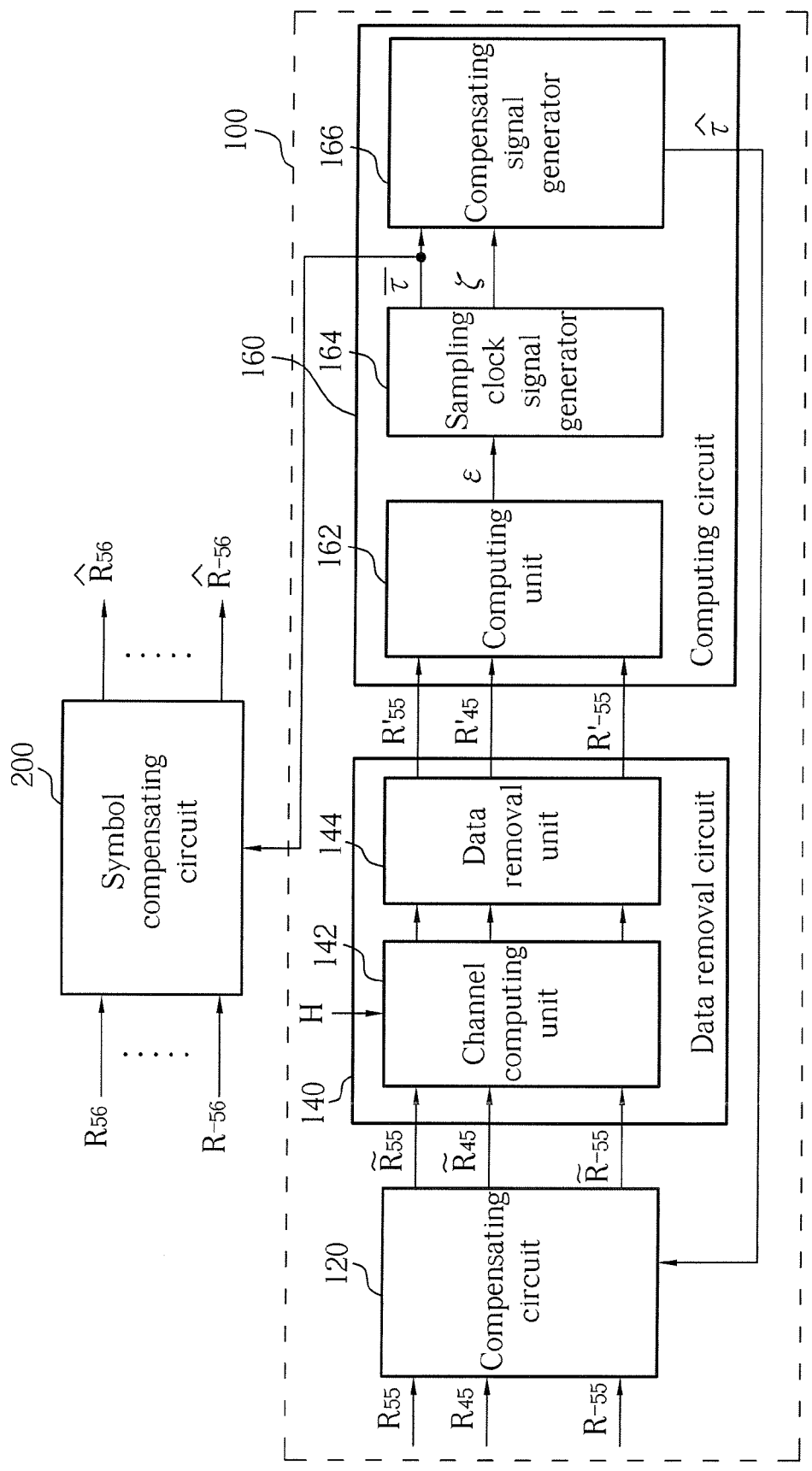
FIG. 1 is a block diagram of a sampling clock tracking apparatus according to an embodiment of the present invention.

Please refer to FIG. 1. FIG. 1 is a block diagram of an apparatus 100 according to the present invention. In the present embodiment, the apparatus 100 generates a sampling clock signal τ̂ according to a plurality of received symbols $R_{55}, R_{45}, \ldots, R_{-55}$ corresponding to a plurality of pilot symbols and transmitting the sampling clock signal τ̂ into a symbol compensating circuit 200, in order to control the symbol compensating circuit 200 to compensate all received symbols $R_{56}, \ldots, R_{-56}$. These received symbols include data symbols and pilot symbols. Therefore, all the received symbol $R_{56}, \ldots, R_{-56}$ will not be influenced by the sampling clock offsets.

In an embodiment, the apparatus 100 comprises a compensating circuit 120, a data removal circuit 140, and a computing circuit 160. The compensating circuit 120 generates a compensated symbol R̃ by adjusting a received symbol R corresponding to each pilot symbol according to a compensating signal τ̂. Please refer to the following equation for the operation of the compensating circuit 120.

$$\tilde{R}_{i,j,k} = R_{i,j,k} \cdot e^{j2\pi \frac{k}{N} \hat{\tau}_i} \qquad \text{Equation (2)}$$

In equation (2), $R_{i,j,k}$ denotes a received symbol (i.e., a pilot symbol) transmitted by a $k^{th}$ sub-carrier and a $j^{th}$ band in a $i^{th}$ time period. The naming and numbering rule is suitable for the remaining symbols, such as the compensated symbols R̃.

In this embodiment, first, the data removal circuit 140 processes in parallel the received symbols R (k=55,45, ..., −55) of the different sub-carriers. It should be noted that each sub-carrier of the sub-carriers corresponds to another sub-carrier. For example, the sub-carrier number "55" corresponds to the sub-carrier number "−55", wherein the two sub-carriers corresponding to each other are in two quadrants which are not adjacent to each other in a constellation diagram. For example, a value corresponding to the sub-carrier number "55" in a constellation diagram is equal to "p+q" (i.e., this is in a first quadrant), and a value corresponding to the sub-carrier number "−55" in a constellation diagram is equal to "−p−q" (i.e., this is in a third quadrant). Next, the data removal circuit 140 generates data removal symbols R' by removing a predetermined transmitted data X from each compensated symbol $\tilde{R}$. Finally, the computing circuit 160 updates the compensating signal $\hat{t}$ according to the data removal symbols R'. At the same time, the computing circuit 160 generates and transmits the sampling clock signal τ to the symbol compensating circuit 200 to further adjust all of the received symbols $R_{56}, \ldots, R_{-56}$ in the multi-carrier communication system. The detailed descriptions of the operations of the data removal circuit 140 and the computing circuit 160 are included in the following paragraphs.

In an embodiment, the data removal circuit 140 comprises a channel computing unit 142 and a data removal unit 144. The channel computing unit 142 adjusts the compensated symbol $\tilde{R}$ utilizing a conjugate value of a channel estimation value H. Next, the data removal unit 144 generates the data removal symbol R' by multiplying the adjusted compensated symbol by a conjugate value X* of the predetermined transmitted data X corresponding to the compensated symbol $\tilde{R}$. Please refer to the following equation for the operations of the channel computing unit 142 and the data removal unit 144.

$$R' = \tilde{R} \cdot H_{i,j,k}^* \cdot X_{i,j,k}^* \approx e^{-j2\pi \frac{k}{N}\tau_{i,j}} \cdot e^{j\psi_{i,j}} \cdot |H_{j,k}|^2 \quad \text{Equation (3)}$$

Please refer to equations (1) and (3). The compensated symbol $\tilde{R}$ is influenced by the channel response. The apparatus 100 utilizes the channel computing unit 142 to multiply the compensated symbol $\tilde{R}$ by the conjugate value of the channel estimation value H, so that the channel response influences the amplitude of the data removal symbol R', and does not influence the argument of the data removal symbol R'. Next, the data removal unit 144 generates the desired data removal symbol R' by multiplying the adjusted compensated symbol $\tilde{R}$ by the conjugate value X* of the predetermined transmitted data X. Therefore, the data removal symbol R' can be viewed as a data without a component of the predetermined transmitted data X.

In an embodiment, the computing circuit 160 comprises a computing unit 162, a sampling clock signal generator 164 and a compensating signal generator 166. The computing unit 162 divides a plurality of data removal symbols R' into two groups. The group membership is according to the positions of the sub-carriers on the constellation diagram, wherein two data removal symbols R' respectively corresponding to two sub-carriers corresponding to each other (i.e. k=55, −55) must be in different groups. Next, the computing unit 162 generates sum results $L_{sum}$ and $R_{sum}$ by summing all of the data removal symbols R' of all groups and generates a sampling clock offset ε by performing a computation on the sum results $L_{sum}$ and $R_{sum}$ according to a predetermined function f. Please refer to the following equations for the operations of the computing unit 162.

$$R_{sum} = \sum_{k>0} R'_{i,j,k} \quad \text{Equation (4)}$$

$$L_{sum} = \sum_{k<0} R'_{i,j,k} \quad \text{Equation (5)}$$

$$\varepsilon_i = \frac{f(R_{sum}, L_{sum})}{\Gamma} \quad \text{Equation (6)}$$

$$f(R_{sum}, L_{sum}) = \text{image}(R_{sum}^* \cdot L_{sum}) \quad \text{Equation (7)}$$

Please note, the predetermined function f is not limited to the form utilized in the present embodiment. The predetermined function f can also be $\text{sign}(R_{sum}^* \cdot L_{sum})$ or other reasonable expressions which represent phase shifts corresponding to the plurality of sub-carriers. It should be noted that an operator image(x) is utilized for computing a value of an image part of a parameter x; for example, if x=A+jB, the value of image(x) is equal to B. On the other hand, an operation sign(x) is utilized for computing a sign (+/−) of the parameter x; for example, if x=+A, the value of sign(x) is equal to +1.

Next, the sampling clock signal generator 164 generates a recursion value ζ according to the sampling clock offset ε in order to provide the recursion value ζ utilized by the compensating signal generator 166. Also, the sampling clock signal generator 164 generates the sampling clock signal τ according to the sampling clock offset ε and transmits the sampling clock signal τ to the symbol compensating circuit 200. Please refer to the following equations for the operations of the sampling clock signal generator 164.

$$\tau_i = \hat{t}_i + \mu_{\tau,i} \cdot \varepsilon_i \quad \text{Equation (8)}$$

$$\zeta_i = \zeta_{i-1} + \mu_{\zeta,i} \cdot \varepsilon_i \quad \text{Equation (9)}$$

In equation (8), $\hat{t}$ denotes the compensating signal presently utilized by the compensating circuit 120. $\mu_\tau$ and $\mu_\zeta$ are utilized for adjusting the sampling clock offset ε to generate the sampling clock signal τ and update the recursion value ζ. Moreover, the compensating signal generator 166 sums the sampling clock signal τ and the recursion value ζ, and updates the compensating signal $\hat{t}$ utilizing the sum value and recursion value ζ. Please refer to the following equation for the operation of the compensating signal generator 166.

$$\hat{t}_{i+1} = \tau_i + \zeta_i \quad \text{Equation (10)}$$

Figure 2:
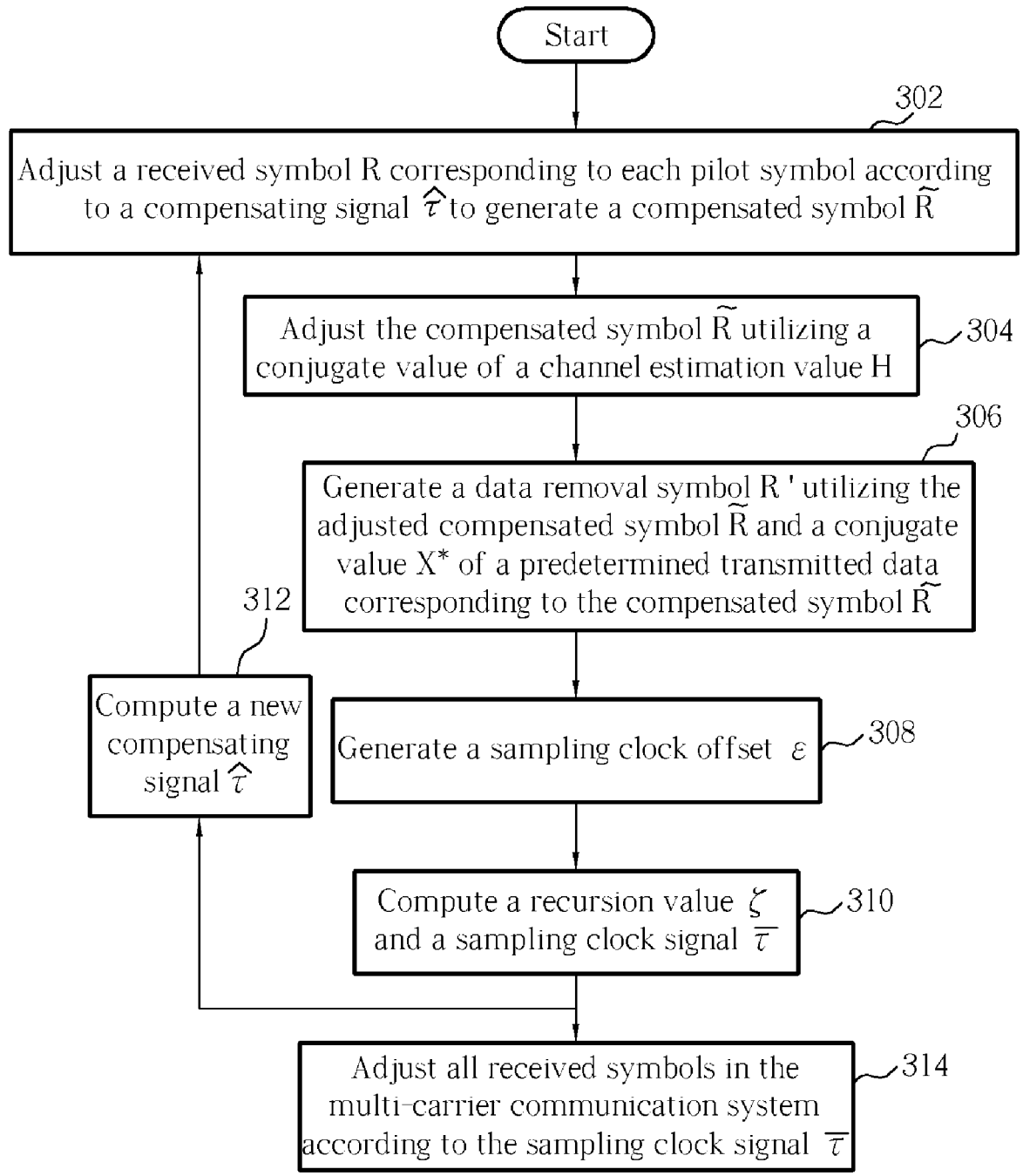
FIG. 2 is a flowchart describing the operation of the sampling clock tracking apparatus shown in FIG. 1 for adjusting a plurality of received symbols.

Please refer to FIG. 2. FIG. 2 is a flowchart describing the operation of the sampling clock tracking apparatus shown in FIG. 1 adjusting a plurality of received symbols. The flowchart comprises the following steps:

Step 302: Adjust a received symbol R corresponding to each pilot symbol according to a compensating signal $\hat{t}$ to generate a compensated symbol $\tilde{R}$.

Step 304: Adjust the compensated symbol $\tilde{R}$ utilizing a conjugate value of a channel estimation value H.

Step 306: Generate a data removal symbol R' utilizing the adjusted compensated symbol $\tilde{R}$ and a conjugate value X* of a predetermined transmitted data corresponding to the compensated symbol $\tilde{R}$.

Step 308: Generate a sampling clock offset ε according to a plurality of data removal symbols R' corresponding to a plurality of sub-carriers.

Step 310: Compute a recursion value $\zeta$ and a sampling clock signal $\tau$.

Step 312: Compute a new compensating signal $\hat{t}$.

Step 314: Adjust all received symbols in the multi-carrier communication system according to the sampling clock signal $\tau$.

In the present embodiment, the apparatus 100 can continuingly update the compensating signal $\hat{t}$ utilizing step 312. This means that the apparatus 100 can be continuingly updating the compensating direction (i.e., the sampling clock apparatus increases or decreases the compensating signal $\hat{t}$) of the compensating circuit 120 so that the value of the sampling clock offset $\epsilon$ approximates 0. Utilizing these steps and according to equations (8)~(10), the sampling clock signal $\tau$ generated by the apparatus 100 also approximates a fixed value. This provides the symbol compensating circuit 200 with the capability to steadily compensate all received symbols in the system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for compensating a sampling clock offset of a sampling clock in a multi-carrier communication system, the sampling clock being used for sampling a plurality of received symbols, the apparatus comprising:
   a compensating circuit compensating a first and a second received symbols according to a compensating signal and thereby generating a first and a second compensated symbols, wherein the first and the second received symbols are corresponding to a first and a second sub-carriers, respectively;
   a data removal circuit, coupled to the compensating circuit, removing a first predetermined transmitted data from the first compensated symbol of the first sub-carrier, and a second predetermined transmitted data from the second compensated symbol of the second sub-carrier and thereby generating a first and a second data removal symbols, respectively; and
   a computing circuit, coupled to the data removal circuit, calculating the sampling clock offset according to the first and the second data removal symbols, generating a sampling clock signal according to the sampling clock offset, and providing the compensating signal for the compensating circuit according to the sampling clock offset.

2. The apparatus of claim 1, wherein the first and the second sub-carriers are in two quadrants in a constellation diagram.

3. The apparatus of claim 1, wherein the first and the second received symbols are pilot symbols.

4. The apparatus of claim 3, wherein the data removal circuit comprises:
   a channel computing unit adjusting the first and the second compensated symbols according to a conjugate value of a channel estimation value to generate a first and a second adjusted symbols; and
   a data removal unit, coupled to the channel computing unit, generating the first data removal symbol according to the conjugate value corresponding to the first predetermined transmitted data and the first adjusted symbol, and generating the second data removal symbol according to the conjugate value corresponding to the second predetermined transmitted data and the second adjusted symbol.

5. The apparatus of claim 1, wherein the computing circuit comprises:
   a computing unit performing a predetermined computation on the first and the second data removal symbols to generate the sampling clock offset;
   a sampling clock signal generator, coupled to the computing unit, generating the sampling clock signal according to the sampling clock offset, and deciding a recursion value according to the sampling clock offset; and
   a compensating signal generator, coupled to the compensating circuit, updating the compensating signal according to the sampling clock signal and the recursion value.

6. The apparatus of claim 5, wherein the recursion value in a first time period corresponds to a first value, and the sampling clock signal generator generates a second value utilized for updating the recursion value by adjusting the first value in a second time period according to the sampling clock offset.

7. The apparatus of claim 5, wherein the sampling clock offset corresponds to a phase of a product of the conjugate value of the first data removal symbol and the second data removal symbol.

8. The apparatus of claim 5, wherein the sampling clock offset corresponds to an image part of a product of the conjugate value of the first data removal symbol and the second data removal symbol.

9. A method for compensating a sampling clock offset of a sampling clock in a multi-carrier communication system, the sampling clock being used for sampling a plurality of received symbols, the method comprising:
   generating a first and a second compensated symbols by compensating a first and a second received symbols according to a compensating signal, wherein, the first and the second received symbols are corresponding to a first and a second sub-carriers, respectively;
   respectively removing a first and a second predetermined transmitted data from the first and the second compensated symbols of the first and the second sub-carriers, and thereby generating a first and a second data removal symbols, respectively;
   calculating the sampling clock offset according to the first and the second data removal symbols; and
   utilizing a sampling clock signal generator for receiving the sampling clock offset and generating a sampling clock signal according to the sampling clock offset; and
   utilizing a compensating signal generator for providing the compensating signal according to the sampling clock offset.

10. The method of claim 9, wherein the first and the second sub-carriers are in two different quadrants of a constellation diagram.

11. The method of claim 10, being applied in a multi-carrier communication system.

12. The method of claim 9, wherein the first and the second received symbols are pilot symbols.

13. The method of claim 12, wherein the step of generating the first and the second data removal symbols comprises:
   adjusting the first and the second compensated symbols according to a conjugate value of a channel estimation value to generate a first and a second adjusted symbols;
   generating the first data removal symbol according to the conjugate value corresponding to the first predetermined transmitted data and the first adjusted symbol; and
   generating the second data removal symbol according to the conjugate value corresponding to the second predetermined transmitted data and the second adjusted symbol.

14. The method of claim 9, further comprising:
deciding a recursion value according to the sampling clock offset; and
updating the compensating signal according to the sampling clock signal and the recursion value.

15. The method of claim 14, wherein the recursion value in a first time period corresponds to a first value, and a second value utilized for updating the recursion value is generated by adjusting the first value in a second time period according to the sampling clock offset.

16. The method of claim 14, wherein the sampling clock offset corresponds to a phase of a product of the conjugate value of the first data removal symbol and the second data removal symbol.

17. The method of claim 14, wherein the sampling clock offset corresponds to a phase of a product of the conjugate value of the first data removal symbol and the second data removal symbol.

* * * * *